Feb. 14, 1967  R. B. HILL  3,304,105
EXPANSION JOINT
Filed June 4, 1964

INVENTOR.
Robert B. Hill
BY
Christel & Bean
ATTORNEYS.

3,304,105
EXPANSION JOINT
Robert B. Hill, Buffalo, N.Y., assignor to Yuba Industries, Inc., a corporation of Delaware
Filed June 4, 1964, Ser. No. 372,596
2 Claims. (Cl. 285—302)

This invention relates generally to the expansion art, and more specifically to a new and useful expansion joint of the slip type. While by no means limited thereto, the joint of my invention is particularly adapted for use in conjunction with relatively small pipe, in place of a conventional, bellows type compensator.

Heretofore, slip type expansion joints have been used primarily with relatively large pipe, having a diameter in excess of three inches. Bellows type compensators have been used with smaller pipe, and these have not been entirely satisfactory. For example, they tend to be noisy in operation. Also, they are subject to fatigue failure.

Accordingly, a primary object of my invention is to provide a slip type expansion joint which is relatively inexpensive and lightweight, being eminently suitable for use with relatively small pipe diameters, and with relatively flexible pipe and tubing.

In one aspect thereof, a slip type expansion joint constructed in accordance with my invention is characterized by the provision of telescoping inner and outer joint members each of one piece, unitary construction, the outer joint member being formed to provide an enlarged guide section, a further enlarged stuffing box section and an external, lateral flange around the outer end of the stuffing box section, the inner joint member being formed to provide a slip of reduced diameter in spaced relation to one end of the inner joint member, the inner joint member end having sliding engagement with the guide section of the outer joint member, a gland encircling the slip in guiding relation thereto, a locking ring encircling the stuffing box, and fastening means extending between the gland and locking ring for drawing the same toward each other.

The foregoing and other objects, advantages and characterizing features of the slip type expansion joint of my invention will become clearly apparent from the ensuing detailed description of an illustrative embodiment thereof, considered in conjunction with the accompanying drawing wherein like reference numerals denote like parts throughout the various views, and wherein.

Figure 1:
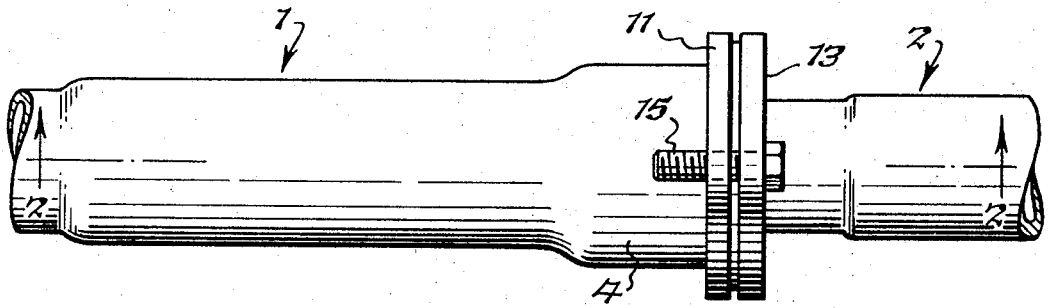
FIG. 1 is a side elevational view of a illustrative slip type expansion joint of my invention, the opposite ends of the joint members being broken away.
Figure 2:
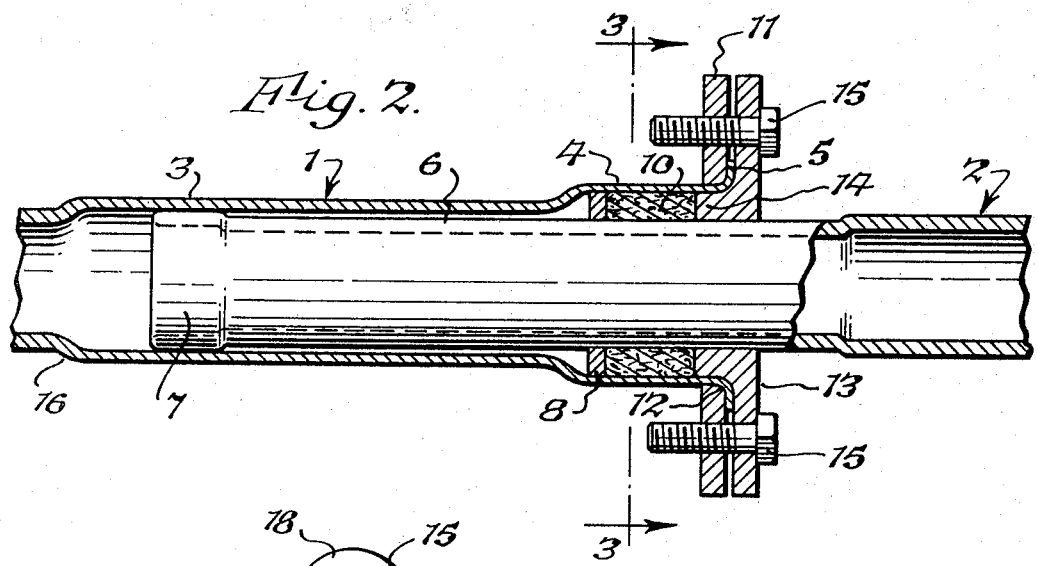
FIG. 2 is a view thereof, partly in longitudinal section and partly in side elevation, taken about on line 2—2 of FIG. 1.

Referring now in detail to the illustrative embodiment of my invention, as depicted in the accompanying drawing, there is shown an expansion joint comprising an outer joint member, generally designated 1, and an inner joint member, generally designated 2.

Member 1 comprises a length of tubular stock, of any material suitable for the purpose, formed to provide an enlarged guide section 3, having adjacent its outer end a further enlarged stuffing box section 4. Member 1 is formed, at the outer end of stuffing box section 4, to provide a lateral, external flange 5.

Member 2, like member 1, comprises a tubular piece of stock, of any material suitable for the purpose. It is formed to provide a slip 6 of reduced diameter, spaced from the inner end of member 2, leaving an inner end portion 7 which is in sliding engagement with the guide section 3 of the outer joint member.

A packing ring 8 encircles slip 6, and seats against the inner end of stuffing box section 4. The stuffing box section 4 is filled with a packing 10, which can be fibrous, plastic or of any suitable material providing a fluid tight joint.

A locking ring 11 encircles stuffing box section 4, and has a rounded inner edge 12 shaped to fit the rounded juncture between stuffing box section 4 and lateral flange 5. A gland 13, having an axial inner extension 14 adapted to penetrate stuffing box section 4, encircles slip 6 on the opposite side of flange 5. Fastening means, in the form of bolts 15, project through openings in gland 13, in threaded engagement with locking ring 11. Bolts 15 thereby maintain the joint in assembled, effectively sealed relation.

Gland 13 is arranged in sliding engagement with slip 6, thereby comprising an outer guide for the joint. This has the advantage of simplicity. However, care must be taken not to scratch the surface of slip 6, because such scratches might permit fluid to escape by packing 10.

The usual ferrous gland will tend to scratch the surface of slip 6. Therefore, I provide a gland 13 of a material substantially softer than that of the slip surface, thereby to avoid scratching. As an example, gland 13 can be made of cast bronze, which has sufficient hardness to enable the gland to perform its guiding function, while being sufficiently soft, to avoid scratching the chrome plated, stainless steel or other highly polished surface of slip 6.

In operation, gland 13 is drawn into place by tightening the fastening bolts 15, with the center 14 of the gland projecting into stuffing box section 4 to compact the packing 10 and provide a fluid tight seal. Locking ring 11 engages behind flange 5, to provide an anchor for the bolts 15. Expansion and contraction can occur, with the inner joint end 7 being guided by the outer joint section 3 and with the inner joint slip 6 being guided by the gland 13. Expansion is limited by engagement of the inner joint end 7 against packing ring 8 and contraction is limited by engagement of the inner joint end 7 against the shoulder 16 formed at the inner end of guide section 3. Gland 13 completes the assembly, compacting the packing and simultaneously guiding the slip 6, without scratching. The entire construction is extremely simple, with both the inner and outer members 1, 2 being of one piece, unitary construction, completely throughout the joint. The ends of the members 1, 2 not shown can be of any conventional construction, forming no part per se of this invention. Where member 1 is provided with a standard threaded half coupling, not shown, the coupling can form shoulder 16.

Figure 3:
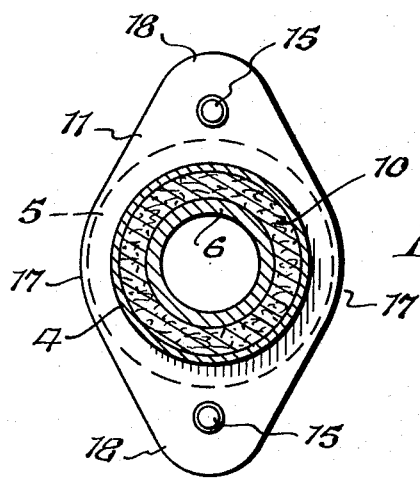
FIG. 3 is a transverse sectional view thereof, taken about on line 3—3 of FIG. 2.

Further, both locking ring 11 and gland 13 are generally rhomboidal in form, with rounded corners, as clearly seen in FIG. 3, it being understood that gland 13 has the same external plan view configuration as that shown for locking ring 11, in FIG. 3. Thus, the opposite side portions 17 of both ring 11 and gland 13 are circular arcs and project only slightly beyond flange 5. The opposite ends 18, on the other hand, project substantially beyond flange 5, forming lobes to receive bolts 15. In this way, the necessary body is provided to receive the fastening bolts, but only to the extent necessary to receive the same, permitting the expansion joint of my invention to be installed closely adjacent another pipe or joint. This is accomplished by rotation of locking ring 11 and gland 13 to position lobe ends 18 where space is available.

In the illustrated embodiment, opposite side portions 17 of ring 11 and gland 13 are formed on a radius slightly greater than that of flange 5, about the axis of the joint, while the opposite end portions 18 thereof are formed on a radius about the axis of bolts 15. The sides and ends 17, 18 are joined by edge portions tangential thereto, providing maximum strength within the desired configuration.

Accordingly, it is seen that my invention fully accomplishes its intended objects. The joint is strong but lightweight, and is quite simple and inexpensive in construction. It is silent in operation, and can be made in sizes much smaller than usually provided in expansion joints of the slip type. While only one embodiment of my invention has been disclosed and described in detail, it is to be understood that this has been done by way of illustration only, it being intended that the scope of my invention be determined by the appended claims.

Having fully disclosed and completely described my invention, and its mode of operation, what I claim as new is:

1. A slip-type expansion joint comprising telescoping inner and outer joint members each of one-piece unitary construction, said outer joint member being formed to provide a guide section having an inner and an outer end and an enlarged stuffing box section at said outer end of said guide section, means forming an internal shoulder at said inner end of said guide section, said stuffing box section terminating at its outer end in an external lateral flange, said inner joint member having a slip portion telescoping within said guide and stuffing box sections and being enlarged adjacent the inner end of said slip portion to a dimension providing a close fitting sliding engagement within said guide section, said enlarged inner end thereby being guided by said guide section, a packing ring encircling said slip portion adjacent the inner end of said stuffing box section, said packing ring having an inner diameter less than the outer diameter of said enlarged inner end of said slip portion to engage said enlarged inner end of said slip portion and limit outward movement of said inner joint member relative to said outer joint member, said shoulder being engaged by said enlarged inner end of said slip portion to limit inward movement of said inner joint member relative to said outer joint member, packing encircling said slip portion within said stuffing box section, a gland encircling said slip portion in close fitting sliding engagement therewith adjacent said outer end of said stuffing box section, said slip portion thereby being guided by said gland, said gland having an axial extension entering said stuffing box section and compacting said packing to provide a fluid tight joint between said members, a locking ring encircling said stuffing box section and engaging said flange on the side thereof opposite said gland, and fastening means extending between said gland and said locking ring for drawing the same together, said locking ring and said gland being generally rhomdoidal with rounded corners, having opposite side portions only slightly wider than said flange and opposite end portions projecting well beyond said flange to receive said fastening means, thereby enabling said joint to be positioned in close proximity to other structures by rotation of said locking ring and gland assembly to position said side portions adjacent such structures.

2. A slip-type expansion joint as set forth in claim 1, wherein said gland comprises a non-ferrous material, such as bronze, of sufficient hardness relative to the exterior surface of said slip portion to enable said gland to perform its guiding function while being sufficiently soft relative to said exterior surface of said slip portion to avoid scratching said exterior surface.

References Cited by the Examiner

UNITED STATES PATENTS

| | | | |
|---|---|---|---|
| 949,811 | 2/1910 | Walsh | 285—302 X |
| 1,420,217 | 6/1922 | Richards | 285—302 X |
| 1,987,372 | 1/1935 | Schellhammer | 285—302 |
| 2,323,179 | 6/1943 | Hall et al. | 285—302 X |

FOREIGN PATENTS

| | | |
|---|---|---|
| 18,492 | 1909 | Great Britain. |
| 858,357 | 1/1961 | Great Britain. |

CARL W. TOMLIN, *Primary Examiner.*

D. W. AROLA, *Assistant Examiner.*